United States Patent
Lee et al.

(10) Patent No.: US 11,098,602 B2
(45) Date of Patent: Aug. 24, 2021

(54) TURBINE VANE EQUIPPED WITH INSERT SUPPORT

(71) Applicant: DOOSAN HEAVY INDUSTRIES & CONSTRUCTION CO., LTD., Changwon-si (KR)

(72) Inventors: Hyuk Hee Lee, Gimhae-si (KR); Sung Chul Jung, Daejeon (KR)

(*) Notice: Subject to any disclaimer, the term of this patent is extended or adjusted under 35 U.S.C. 154(b) by 140 days.

(21) Appl. No.: 16/294,947

(22) Filed: Mar. 7, 2019

(65) Prior Publication Data
US 2019/0316478 A1 Oct. 17, 2019

(30) Foreign Application Priority Data
Apr. 17, 2018 (KR) .................. 10-2018-0044538

(51) Int. Cl.
F01D 9/04 (2006.01)
F01D 5/18 (2006.01)
F01D 25/12 (2006.01)

(52) U.S. Cl.
CPC .............. *F01D 9/041* (2013.01); *F01D 5/188* (2013.01); *F01D 25/12* (2013.01); *F05D 2220/32* (2013.01); *F05D 2240/126* (2013.01); *F05D 2260/202* (2013.01)

(58) Field of Classification Search
CPC .......... F01D 9/041; F01D 25/12; F01D 9/065; F01D 5/189; F01D 5/188; F01D 9/02; F05D 2220/32; F05D 2260/202; F05D 2240/126; F05D 2260/30; F05D 2260/201
USPC ........................................................ 415/115
See application file for complete search history.

(56) References Cited

U.S. PATENT DOCUMENTS

| | | | | |
|---|---|---|---|---|
| 3,388,888 A | * | 6/1968 | Kercher | F01D 5/189 415/115 |
| 3,628,880 A | * | 12/1971 | Smuland | F01D 9/04 415/175 |
| 3,902,820 A | * | 9/1975 | Amos | F01D 5/189 416/97 R |
| 3,994,622 A | * | 11/1976 | Schultz | F01D 5/189 416/97 R |
| 4,025,226 A | * | 5/1977 | Hovan | F01D 5/186 415/115 |
| 4,063,851 A | * | 12/1977 | Weldon | F01D 5/186 416/97 A |

(Continued)

FOREIGN PATENT DOCUMENTS

| | | | | |
|---|---|---|---|---|
| DE | 2555049 A | * | 6/1975 | ............. F01D 5/188 |
| GB | 1404757 A | * | 9/1975 | ............. F01D 5/188 |

(Continued)

*Primary Examiner* — J. Todd Newton, Esq.
(74) *Attorney, Agent, or Firm* — Harvest IP Law, LLP (57) ABSTRACT

Disclosed is a turbine vane having a turbine vane airfoil extending from a platform to an end wall and having an airfoil-shaped cross section having a leading edge, a trailing edge, and a pressure side and a suction side that extend from the leading edge to the trailing edge, wherein a plurality of cavities defined by a plurality of ribs extending from the pressure side to the suction side is formed in the turbine vane airfoil, at least one of the cavities is provided with a plurality of insert supports protruding inward from an inner surface of the turbine vane airfoil, and the insert supports are arranged in a circumferential direction of the cavity and arranged in a plurality of rows arranged in a radial direction.

17 Claims, 7 Drawing Sheets

(56) References Cited

U.S. PATENT DOCUMENTS

| | | | | |
|---|---|---|---|---|
| 4,168,938 | A * | 9/1979 | Dodd | F01D 5/188 415/115 |
| 4,183,716 | A * | 1/1980 | Takahara | F01D 5/189 415/115 |
| 5,716,192 | A | 2/1998 | Phillips et al. | |
| 6,318,960 | B1 * | 11/2001 | Kuwabara | F01D 5/145 415/115 |
| 6,652,220 | B2 | 11/2003 | Powis et al. | |
| 7,300,251 | B2 * | 11/2007 | Kitamura | F01D 5/189 416/97 R |
| 8,348,613 | B2 * | 1/2013 | Gregg | F01D 5/189 416/96 A |
| 8,393,867 | B2 * | 3/2013 | Chon | F01D 5/188 416/96 A |
| 8,998,571 | B2 * | 4/2015 | Burdgick | F01D 5/147 415/169.3 |
| 10,119,404 | B2 * | 11/2018 | Srinivasan | F01D 5/187 |
| 2014/0286762 | A1 * | 9/2014 | Kerber | F01D 5/189 415/175 |
| 2015/0198050 | A1 * | 7/2015 | Lee | F01D 9/041 415/115 |

FOREIGN PATENT DOCUMENTS

| | | |
|---|---|---|
| JP | 06-101406 A | 4/1994 |
| JP | 3142850 B2 | 3/2001 |
| JP | 2003-083001 A | 3/2003 |
| JP | 2009-534570 A | 9/2009 |
| JP | 4669202 B2 | 4/2011 |
| JP | 2017-150333 A | 8/2017 |
| KR | 10-1998-0024573 A | 7/1998 |
| KR | 10-2011-0108418 A | 10/2011 |
| KR | 10-1239595 B1 | 3/2013 |
| KR | 10-1820852 B1 | 1/2018 |

* cited by examiner

TURBINE VANE EQUIPPED WITH INSERT SUPPORT

CROSS REFERENCE TO RELATED APPLICATION

The present application claims priority to Korean Patent Application No. 10-2018-0044538, filed Apr. 17, 2018, the entire contents of which is incorporated herein for all purposes by this reference.

BACKGROUND OF THE DISCLOSURE

1. Field of the Disclosure

The present disclosure relates to a turbine vane of a gas turbine. More particularly, the present disclosure relates to a turbine vane having an insert support structure for supporting an insert which is used for securing a space for impingement cooling on an inner surface of the turbine vane in which the turbine vane and the insert support structure are formed as a unitary body to reduce manufacturing cost of the turbine vane and to minimize vibration of the insert.

2. Description of the Background Art

A turbine is a mechanical device for obtaining torque from an impulse force or a reaction force generated by a flow of compressible fluid such as gas. The turbine is categorized into a steam turbine using steam as the compressible fluid of a gas turbine using hot combustion gas as the compressible fluid.

The gas turbine is mainly composed of a compressor section, a combustor section, and a turbine section. The compressor section includes a compressor casing with an air inlet through which air is introduced into the compressor casing. In the compressor casing, a plurality of compressor vanes and a plurality of compressor blades are alternately arranged. The air introduced from outside is compressed to a higher pressure each time the air passes several stages of rotary turbine blades until reaching a target pressure.

The combustor section supplies fuel to the compressed air generated by the compressor section and ignites the fuel-air mixture with a burner to produce high-pressure, hot combustion gas.

The turbine section includes a turbine casing in which a plurality of turbine vanes and a plurality of turbine blades are alternately arranged. A rotor extends through the centers of the compressor section, the combustor section, the turbine section, and an exhaust chamber.

The rotor is rotatably supported by bearings at respective axial ends thereof. A plurality of disks is fixed to the rotor such that a plurality of blades is connected. An end of the rotor, which is on the exhaust chamber side, is connected to a drive shaft of an electric generator or like.

The gas turbine does not include a reciprocating mechanism, such as a piston, which is usually present in a typical four-stroke engine. Therefore, the gas turbine has no mutual frictional parts, such as a piston-cylinder part, thereby consuming an extremely small amount of lubricating oil and reducing an operational movement range, which results in high speed operability.

During the operation of the gas turbine, air is first compressed by a compressor and then the resulting compressed air is mixed with fuel. Then, the fuel-air mixture is burned to produce hot combustion gas, and the hot combustion gas is ejected toward a turbine. The ejected combustion gas generates a rotary force by passing the turbine vanes and the turbine blades, thereby generating the rotor.

There are various factors affecting the efficiency of the gas turbine. Recent development in the field of gas turbines has progressed in various aspects, such as improvement in combustion efficiency of the combustor, improvement in thermodynamic efficiency through the increase of a turbine inlet temperature, and improvement in aerodynamic efficiency of the compressor and the turbine.

SUMMARY OF THE DISCLOSURE

Industrial gas turbines for power generation can be classified into various classes according to the turbine inlet temperature (TIT). Currently, G- and H-class gas turbines are dominant in the field of the gas turbine. Recently, some latest gas turbines are found to reach J class. The higher the class of the gas turbine, the higher the turbine efficiency and the turbine inlet temperature. For an H-class gas turbine, the development of heat-resistant materials and the development of cooling technology are required because the H-class gas turbine has the turbine inlet temperature of 1500° C.

A heat-resistant design is needed through all the parts of the gas turbine especially in a combustor and a turbine where hot combustion gas is generated and flows. A method of cooling the gas turbine is an air-cooling method in which compressed air generated by the compressor is used. For turbine cooling, it is especially difficult to design a cooling structure due to the complex structure of the turbine in which turbine vanes are fixedly arranged between rotating turbine blades over several stages.

In the case of turbine vanes, a number of cooling holes and a number of cooling slots are formed to protect the turbine vanes from a thermal stress environment attributable to the flow of hot combustion gas. Turbine vane cooling methods are broadly categorized into an impingement cooling and film cooling. The impingement cooling is a process in which compressed high-pressure air collides directly with the surface of a hot member to cause cooling, and film cooling forms a thin air layer with a very low thermal conductivity on the surface of a member exposed to a high temperature environment, thereby causing cooling and suppressing heat transfer from the high temperature environment. The turbine vane is subjected to combined cooling in which the impingement cooling is performed on the inner surface of the turbine vane, and the film cooling is performed on the outer surface the turbine vane, along which hot combustion gas flows. The combined cooling protects the turbine vane in the high temperature environment.

In order to cause the impingement cooling on the inner surface of the turbine vane, a cavity where the compressed air flows and the inner surface of the turbine vane need to be spaced by a predetermined distance. That is, an inner wall serving as a partition between the cavity and the inner surface of the turbine vane is formed. The inner wall is provided with a number of collision cooling holes which are in the form of through-holes. Therefore, compressed air in the cavity is injected toward the inner surface of the turbine vane.

In many cases, a separate insert is inserted into a casted turbine vane and is anchored to the inner surface of the turbine vane to form the inner wall. In this case, a support for anchoring the insert to be spaced apart from the inner surface of the turbine vane is attached to the surface of the insert by means of welding or the like. However, attaching a large number of supports has made the insert manufacturing process difficult. In other words, work of attaching numerous supports by means of welding is troublesome and is likely to cause defects. Especially, when the distance between the inner surface of the turbine vane and the insert gradually changes in a radial direction, the inserts need to be designed to have different heights, and each of the supports needs to be precisely positioned. Therefore, it is difficult to manufacture the turbine vane with the conventional manufacturing technology.

Accordingly, the present disclosure has been made in view of the problems occurring in the related art and an objective of the present disclosure is to provide a method of improving the manufacturing efficiency and reducing the manufacturing cost of a turbine by modifying the basic structure of an insert anchoring structure.

In one aspect of the present disclosure, there is provided a turbine vane having a turbine vane airfoil extending from a platform to an end wall and having an airfoil-shaped cross section having a leading edge, a trailing edge, and a pressure side and a suction side that extend from the leading edge to the trailing edge, wherein a plurality of cavities defined by a plurality of ribs extending from the pressure side to the suction side is formed in the turbine vane airfoil, at least one of the cavities is provided with a plurality of insert supports protruding inward from an inner surface of the turbine vane airfoil, and the insert supports are arranged in a circumferential direction of the cavity and arranged in a plurality of rows arranged in a radial direction.

Preferably, the number of insert supports arranged at intervals along the circumference of the cavity may be three or four.

Preferably, the insert support may be disposed at a border between a pressure side and a suction side of the inner surface of the turbine vane airfoil, a border between the pressure side and the rib, or a border between the suction side and the rib.

In a cross-sectional view that transverses the radial direction, the insert supports provided on the pressure side and the suction side of the inner surface of the turbine vane airfoil have a rectangular shape, and the insert support provided at the border between the pressure side and the rib or the border between the suction side and the rib has a triangular shape.

In one embodiment of the present disclosure, two of the insert supports may be provided respectively on the pressure side and the suction side of the inner surface of the turbine vane airfoil and one of the insert supports may be provided at the border between the pressure side and the rib or the border between the suction side and the rib so that a three-point support structure is configured on the cross-sectional view that transverses the radial direction.

In one embodiment of the present disclosure, two of the insert supports may be disposed respectively on the pressure side and the suction side of the inner surface of the turbine vane airfoil and two of the insert supports may be disposed respectively at the border between the pressure side and the rib and the border between the suction side and the rib, so that a four-point structure is configured on the cross-sectional view that transverses the radial direction.

In one embodiment of the present disclosure, the multiple insert supports may be arranged such that heights of the insert supports are alternate in the circumferential direction of the radial direction and in the radial direction in which rows of the insert supports are arranged.

In the embodiment, two of the insert supports may be disposed respectively on the pressure side and the suction side of the inner surface of the turbine vane airfoil and one of the insert supports may be disposed at the border between the pressure side and the rib or the border between the suction side and the rib, so that a three-point structure in which three supporting points are disposed in two consecutive rows on the cross-sectional view that transverses the radial direction is formed.

Additionally, two of the insert supports may be disposed respectively on the pressure side and the suction side of the inner surface of the turbine vane airfoil and two of the insert supports may be disposed at the border between the pressure side and the rib and the border between the suction side and the rib, so that a four-point structure in which four supporting points are disposed in two consecutive rows on the cross-sectional view that transverses the radial direction is formed.

The plurality of insert supports arranged in rows arranged in the radial direction of the cavity may show a linear change in the height thereof.

In another aspect of the present disclosure, there is provided a turbine vane assembly including the turbine vane structured as described above and a pipe-type insert supported by the insert supports and provided with a plurality of through holes formed in a surface thereof.

In a cross-sectional view that traverses the radial direction, the insert has a cross-sectional shape similar to a cross-sectional shape of the cavity, resulting in a structure in which an annular space formed between the inner surface of the turbine vane airfoil and the cavity has a uniform width.

The insert supports arranged in the rows arranged in the radial direction of the cavity may be formed such that the heights of the insert supports show a linear change starting from an insert inlet.

Since the turbine vane according to the present disclosure is formed such that the insert support is integrated with the main body of the turbine vane, which is manufactured through a casting process, the manufacturing of the turbine vane is completed by simply inserting the insert into the inside of the main body of the turbine vane without using an additional inconvenient process. Thus, the manufacturing cost of the turbine vane is greatly reduced.

In addition, in designing the mold of the insert supports that are to be integrally formed with the main body of the turbine vane through a casting process, the positions and heights of the insert supports can be optimally determined. Therefore, it is possible to prevent defect that is likely to be caused when an insert support is welded to an insert in a conventional turbine vane and to easily define the gap between the turbine vane and the insert.

In addition, the insert support has an advantage of effectively suppressing the vibration of the insert because the insert support is a 3-point or 4-point stable support.

DETAILED DESCRIPTION OF THE DISCLOSURE

The present disclosure may be embodied in many forms and have various embodiments. Thus, specific embodiments will be presented and described in detail below. While specific embodiments of the disclosure will be described herein below, they are only illustrative purposes and should not be construed as limiting to the present disclosure. Thus, the present disclosure should be construed to cover not only the specific embodiments but also cover all modifications, equivalents, and substitutions that fall within the spirt and technical spirit of the present disclosure.

The terminology used herein is for the purpose of describing particular embodiments only and is not intended to limit the disclosure. As used herein, the singular forms "a", "an", and "the" are intended to include the plural forms as well unless the context clearly indicates otherwise. It will be further understood that the terms "comprise", "include", or "has" when used in this specification specify the presence of stated features, regions, integers, steps, operations, elements and/or components, but do not preclude the presence or addition of one or more other features, regions, integers, steps, operations, elements, components and/or combinations thereof.

Herein below, preferred embodiments of the disclosure will be described in detail with reference to the accompanying drawings. Throughout the drawings, the substantially same elements are denoted by the same reference symbols. In describing embodiments of the present disclosure, well-known functions or constructions will not be described in detail when it is determined that they may obscure the spirit of the present disclosure. Further, some components are not illustrated, are schematically illustrated, or are illustrated in an exaggerated manner in the accompanying drawings.

Figure 1:
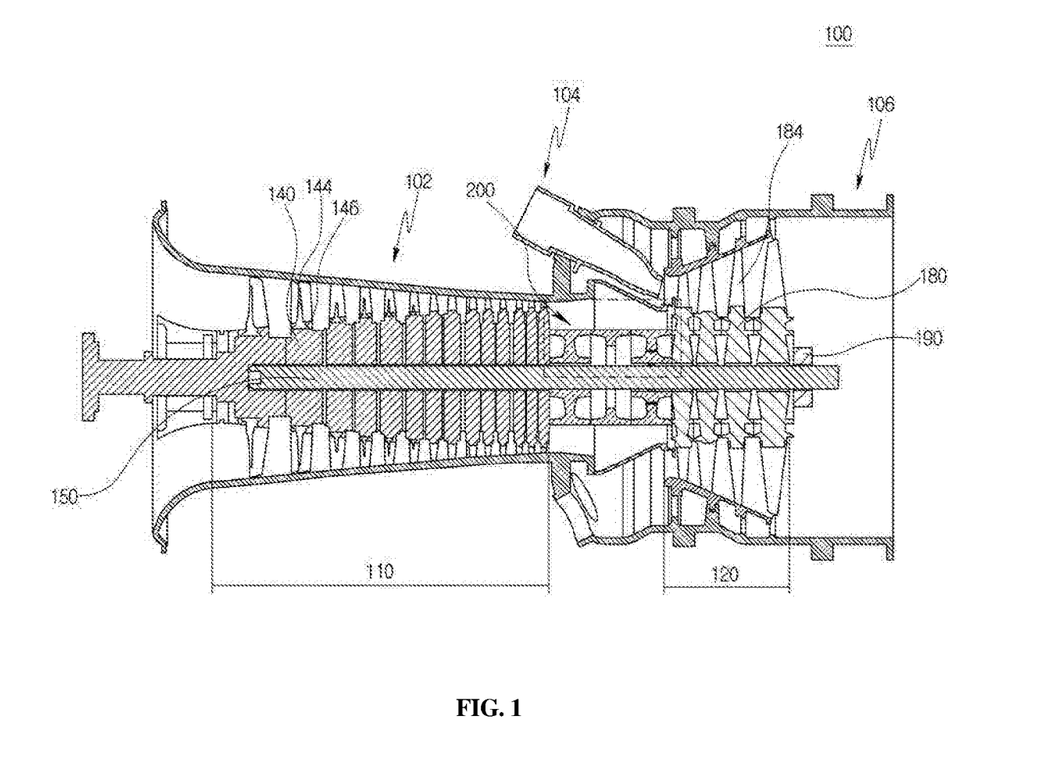
FIG. 1 is a cross-sectional view schematically illustrating the structure of a gas turbine according to one embodiment of the present disclosure.

FIG. 1 illustrates an exemplary gas turbine 100 to which an embodiment of the present disclosure is applied. The gas turbine 100 includes a housing 102, and a diffuser 106 through which a combustion gas is discharged is provided at a rear end of the housing 102. A combustor 104 that burns compressed air is provided in front of the diffuser 106.

In terms of an air flow direction, a compressor section 110 is provided at an upstream side of the housing 102, and a turbine section 120 is provided at a downstream side of the housing 100. A torque tube serving as a torque transfer member for transferring the torque generated in the turbine section to the compressor section is provided between the compressor section 110 and the turbine section 120.

The compressor section 110 is provided with a plurality of (for example, 14) compressor rotor disks 140, and each of the compressor disks 140 is fastened by a tie rod 150 so as not to be separated from each other in the axial direction of the tie rod 150.

Specifically, the compressor rotor disks 140 are arranged in the axial direction in a state in which the tie rod 150 extends through the central holes of the compressor rotor disks. Here, each of the adjacent compressor rotor disks 140 is disposed such that the opposing surfaces of the adjacent compressor rotor disks are in tight contact with each other by being pressed by the tie rod 150. The compressor rotor disks 140 cannot rotate because of this arrangement.

A plurality of blades 144 is radially coupled to the outer circumferential surface of each of the compressor rotor disks 140. Each of the blades 144 has a root member 146 so that the blades 144 are coupled to the compressor rotor disk 140.

Vanes (not shown) fixed to the inner surface of the housing are positioned between each of the rotor disks 140. The vanes do not rotate because the vanes, unlike the rotor disks, are fixed. The vanes align the flow of the compressed air passing through the blades of an upstream compressor rotor disk to guide the air to the blades of a downstream compressor rotor disk.

There are two coupling types for the root member 146, namely tangential and axial. Any one of the coupling types is selected according to the structure of the gas turbine 100. The root member has a dove tail structure or a fir-tree structure. In some cases, the blades 144 may be coupled to the rotor disk by means of different types of coupling members, such as a key or a bolt.

The tie rod 150 is installed to extend through the centers of the multiple compressor rotor disks 140. In addition, an end of the tie rod 150 is fixed in the most upstream compressor rotor disk and the other end is fixed in the torque tube.

The shape of the tie rod 150 varies according to the type of the gas turbine. Therefore, it should be noted that the shape of the tie rod 150 is not limited to the example illustrated in FIG. 1. For example, there is a single-type in which a single tie rod extends through the centers of all of the rotor disks. Alternatively, there is a multi-type in which multiple tie rods are arranged in a circumferential direction. Further alternatively, a complex type in which the single-type and the multi-type are combined is also possible.

Although not illustrated in the drawings, a deswirler is installed at the next stage of the diffuser of the compressor of the gas turbine. The deswirler is a guide vane configured to control an actual inflow angle of fluid (e.g., high-pressure compressed air generated by the compressor) entering an inlet of the combustor so that the actual inflow angle matches the designed inflow angle.

The combustor 104 mixes the introduced compressed air with fuel, burns the fuel-air mixture to produce hot high-pressure combustion gas, and increases the temperature of the hot high-pressure combustion gas to the heat-resisting temperatures of parts of the combustor and the turbine through an isobaric combustion process.

A plurality of combustors constituting a combustion system of the gas turbine is arranged in the cells of a casing. Each combustor includes a burner having a fuel injection nozzle and the like, a combustor liner defining a combustion chamber, and a transition piece serving as a connector between the combustor and the turbine.

Particularly, the liner provides a combustion zone in which the fuel injected through the fuel injection nozzle and the compressed air fed from the compressor are mixed and burned. The liner includes a flame tube providing the combustion zone in which the fuel-and-air mixture is burned and a flow sleeve that surrounds the flame tube to provide an annular space between the flow sleeve and the flame tube. A fuel nozzle is coupled to a front end of the liner, and a spark igniter plug is coupled to the flank surface of the liner.

The transition piece is connected to the rear end of the liner to deliver the combustion gas toward the turbine. The transition piece is configured such that the outer wall surface thereof is cooled by the compressed air supplied from the compressor. Therefore, it is possible to prevent the transition piece from being damaged.

To this end, the transition piece is provided with cooling holes through which the compressed air is blown into the transition piece. The compressed air cools the inside of the main body of the transition piece and then flows toward the liner side.

Cooling air used to cool the transition piece flows through the annulus space of the liner. The liner is configured such that cooling air externally introduced into the annular space through the cooling holes formed in the flow sleeve impinges the outer wall of the liner.

The hot high-pressure combustion gas ejected from the combustor is introduced into the turbine section 120. In the turbine section, the supplied hot high-pressure combustion gas expands and gives a reaction force or impulse force to the rotating blades of the turbine to generate a torque. A portion of the torque is transmitted to the compressor 200 via the torque tube described above and to the other portion where the excessive power is used to drive an electric generator or the like.

The turbine section is basically similar in structure to the compressor section. That is, the turbine section 120 is provided with a plurality of turbine rotor disks 180 similar to the compressor rotor disks 140 of the compressor section 110. The turbine rotor disk 180 includes a plurality of turbine blades 184 radially arranged on the outer surface of the turbine rotor disk 180. The turbine blades 184 are coupled to the turbine rotor disk 180 in a dovetail coupling manner. In addition, vanes (not shown) fixed to the housing are provided between the blades 184 of the turbine rotor disk 180 to control the direction of the flow of the combustion gas passing through the blades.

Figure 2:
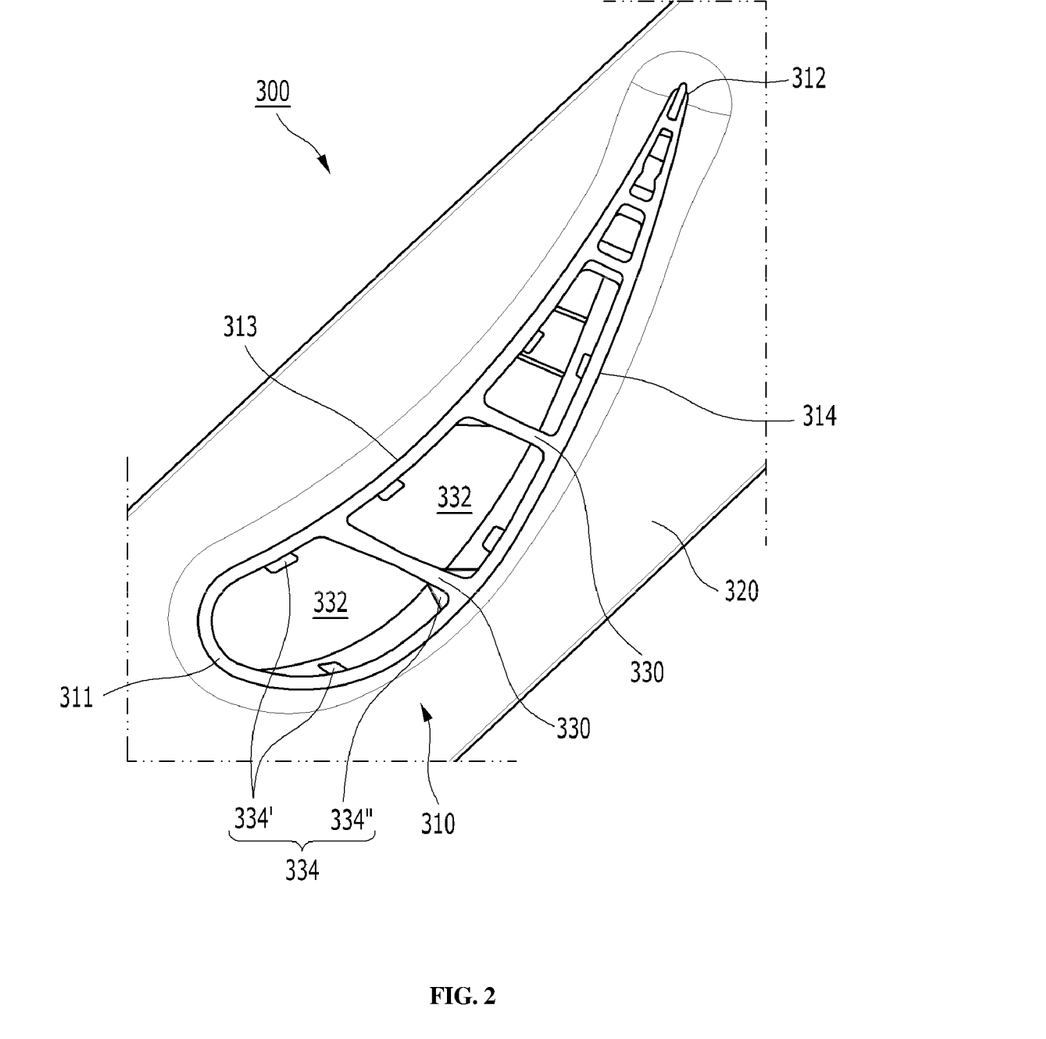
FIG. 2 is a cross-sectional view of a cavity of a turbine vane according to one embodiment of the present disclosure, which is viewed from a radial direction.
Figure 3:
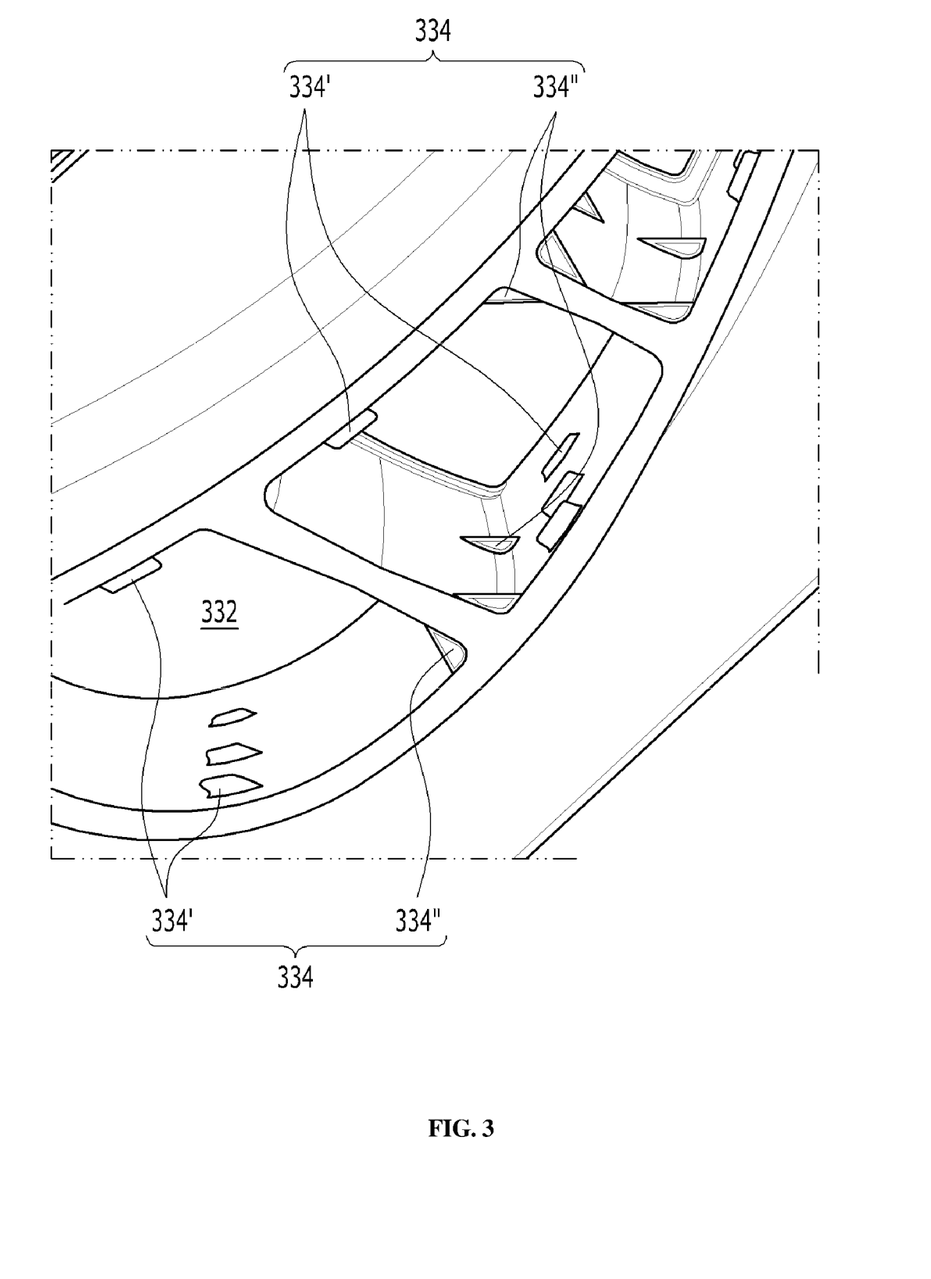
FIG. 3 is a perspective view illustrating the cavity of FIG. 2, which is viewed in a diagonal direction.

FIG. 2 is a cross-sectional view of the cavity 332 of the turbine vane 300 according to the present disclosure, viewed from a radial direction, and FIG. 3 is a perspective view of the cavity 332 of FIG. 2, viewed obliquely. Hereinbelow, the present disclosure will be described in detail with reference to the accompanying drawings.

Figure 6:
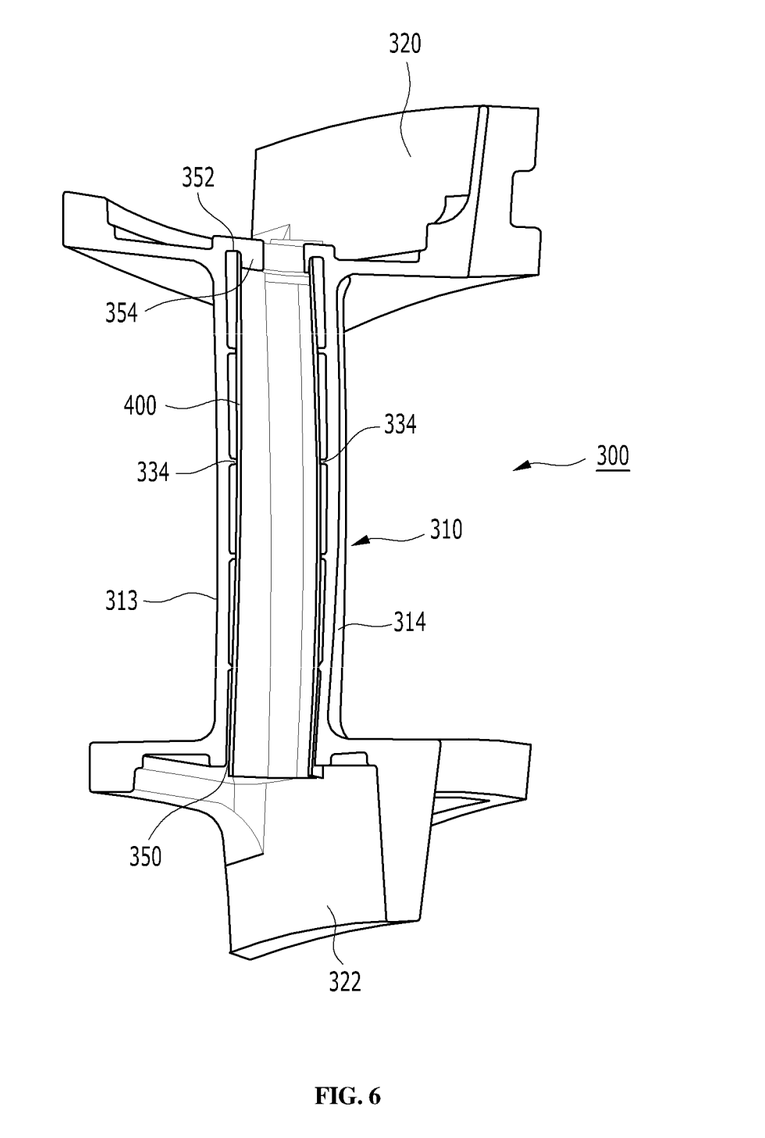
FIG. 6 is a cross-sectional view illustrating the state in which the insert is combined with the main body of the turbine vane of FIG. 2, which is viewed from a radial direction.

The turbine vane 300 according to the present disclosure includes a turbine vane airfoil 310 extending from a platform 320 to an end wall 322 (See FIG. 6). The turbine vane airfoil 310 has an airfoil-shaped cross section having a leading edge 311, a trailing edge 312, a pressure side 313, and a suction side 314. The pressure side 313 and the suction side 314 are formed to extend from the leading edge 311 to the trailing edge 312. In the turbine vane airfoil 310, the plurality of cavities 332 are defined by a plurality of ribs 330 extending from the pressure side 313 to the suction side 314. Each of the cavities 332 is provided with a plurality of insert supports 334 protruding inward from the inner surface of the turbine vane airfoil 310.

Figure 5:
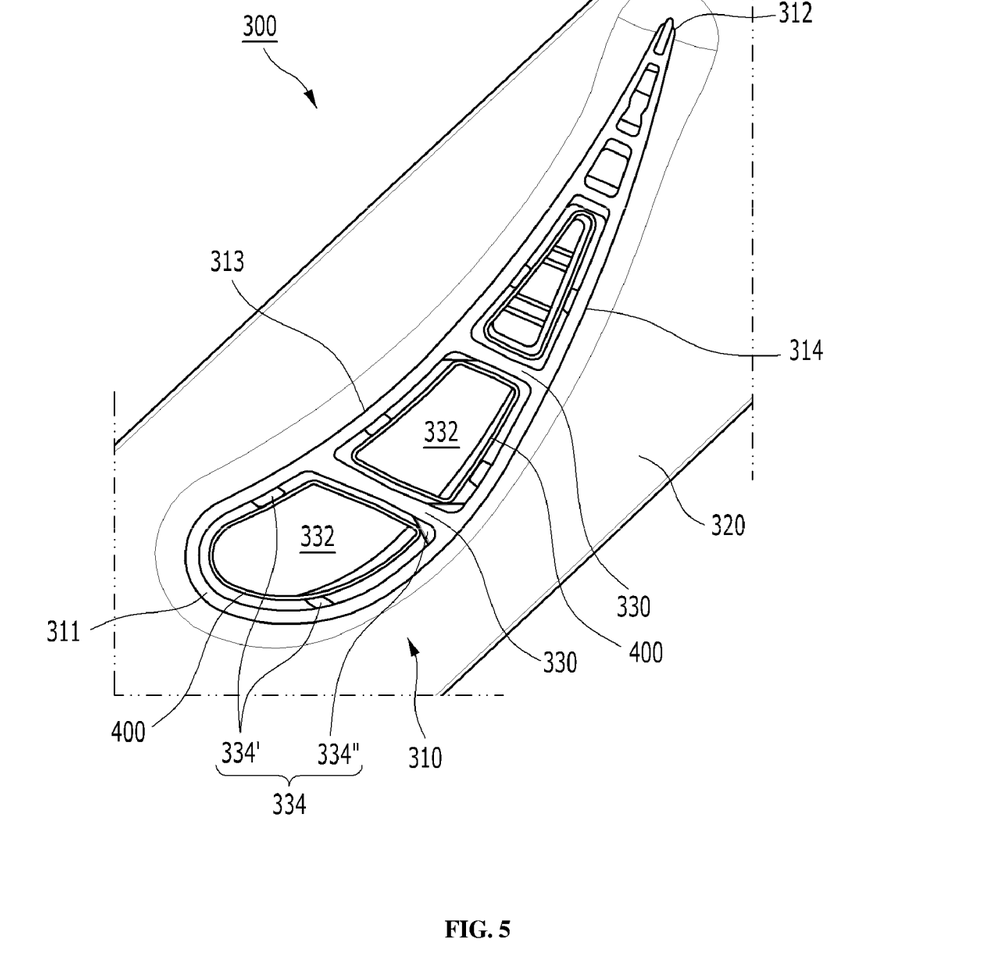
FIG. 5 is a cross-sectional view illustrating a state in which an insert is combined with a main body of the turbine vane of FIG. 2.

The multiple insert supports 334 are arranged at intervals in a circumferential direction of the cavity 332 and are arranged in multiple rows arranged at intervals in a radial direction. FIG. 5 illustrates a state in which a pipe-shaped insert 400 is inserted into the turbine vane 300. The combined structure of the turbine vane 300 and the insert 400 is referred to as a turbine vane assembly. The insert 400 is in contact with and supported by the multiple insert supports 334 formed in each of the cavities 332.

The turbine vane assembly of the present disclosure has the plurality of cavities 332 defined by the plurality of ribs 330 extending from the pressure side 313 to the suction side 314. The ribs 330 are alternately coupled to the platform 320 and the end wall 322 so as to form a meandering flow path in which the flow direction of the compressed air flowing in the radial direction of the turbine vane airfoil 310 is reversed multiple times.

As described above, the insert 400 serves as an inner wall surface for impingement cooling in the turbine vane 300, and is formed in the form of a pipe having a plurality of through holes formed to pass through the pipe wall. In a cross-sectional view of the turbine vane airfoil 310, viewed in a direction that transverses the radial direction, the insert 400 has a cross-sectional shape that is similar to the cross-sectional shape of the cavity 332. An annular space formed between the inner surface of the turbine vane airfoil 310 and the cavity 332 has a uniform width, thereby achieving a uniform collision cooling effect over the entire inner surface of the turbine vane airfoil.

Hereinafter, the structure of the insert support 334 that can stably support the insert 400 and is suitable for manufacturing a unitary body of the insert 400 and the turbine vane 300 through a casting process will be described in detail. Here, a part of the cavities formed in the turbine vane 300 is not provided with the insert 400. For example, since the cavity 332 closest to the trailing edge 312 is narrow, the insert 400 is not provided in that cavity. That is, the present disclosure should not be construed to be limited to the turbine vane 300 in which all of the cavities are provided with the inserts 400.

Preferably, the number of insert supports 334 arranged at intervals along the circumferential surface of the cavity 332 is three or four. Thus, the number of rows of the insert supports 334 arranged in the radial direction is also three or four. The reason why the number of insert supports 334 is set to be three or four is to achieve a three-point or four-point support structure that is a stable support structure. When the number of insert supports 334 is greater than 4, some excessive insert supports 334 may not contribute at all to the supporting of the insert 400 due to the tolerance of a casted structure, but rather serve as obstacles when the insert 400 is inserted into the cavity of the turbine vane. That is, the restriction on the number of insert supports is to prevent such an interference problem and to minimize post-processing steps.

In particular, the insert supports 334 are preferably located at the border between the pressure side 313 and the suction side 314 of the inner surface of the turbine vane airfoil 310, the border between the pressure surface 313 and the rib 330, or the border between the suction surface 314 and the rib 330. The positions of the insert supports are determined while taking into account the casting process of the turbine vane 300 and will be described with reference to FIGS. 4(a) and 4(b).

Figure 4A:
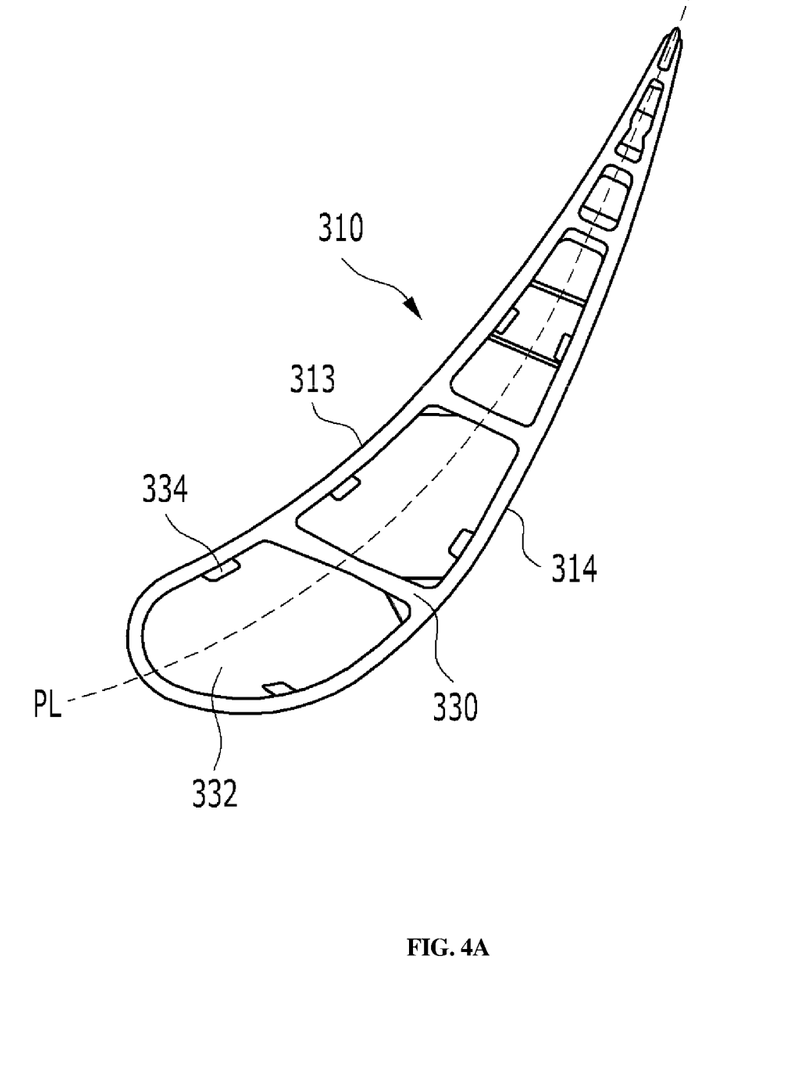
FIGS. 4A and 4B are diagrams schematically illustrating a casting process for manufacturing a turbine vane.
Figure 4B:
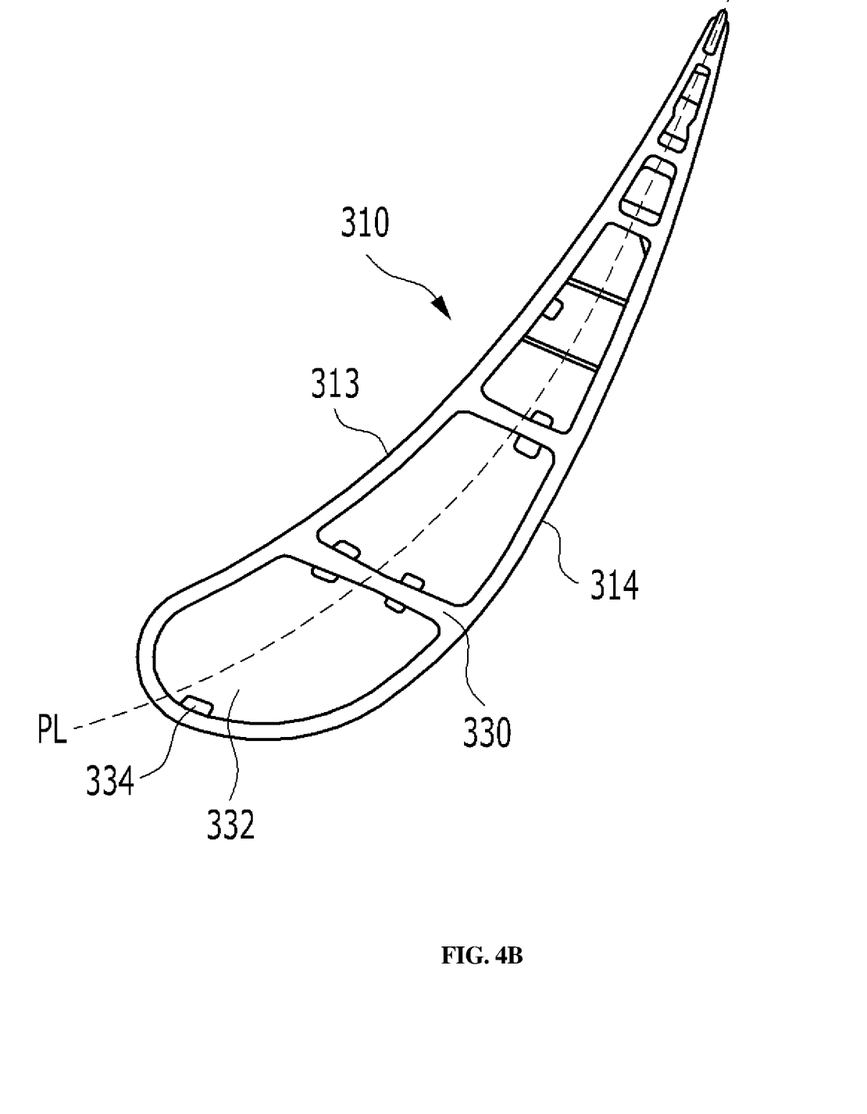

When the turbine vane 300 is manufactured through a casting process, one or more cores are required to form at least two molds and cavities 332 in which the number of cores is equal to the number of cavities. The mold of the turbine vane 300 is typically designed such that parting lines PL are provided at the leading edge 311 and the trailing edge 312 because a factor having a significant effect on aerodynamic performance in the turbine vane airfoil 310 is the curved profile of the pressure side 313 and the suction side 314.

Here, when designing the turbine vane 300, it may be necessary to take into account that the shape of the turbine vane 300 that is a casted item does not interfere with demolding of the turbine vane 300 after molten iron is poured into a mold and is then cured. In the case where the parting lines PL of the turbine vane 300 are formed at the leading edge 311 and the trailing edge 312, the structure in which the insert supports 334 are formed at the leading edge 311 and the trailing edge 312 of the turbine vane airfoil 310 is disadvantageous in terms of a mold design. For example, when the insert supports 334 are disposed at the leading edge 311 and the trailing edge 312 of the turbine vane airfoil 310, the number of molds and cores needs to be increased to enable the demolding. Referring to FIG. 4(a), the positions of the insert supports 334 are limited to the border between the pressure side 313 and the rib 330 and the border between the suction side 314 and the rib 330. Therefore, the mold can be divided into two halves at the parting lines PL. However, in the case of the turbine vane airfoil 310 illustrated in FIG. 4(b), since a part of the insert supports 334 is positioned at the leading edge and the trailing edge of the turbine vane airfoil 310, the mold cannot be divided into two halves.

In a cross-sectional view of the turbine vane 300 taken along a line that transverses the radial direction, preferably, insert supports 334' formed on the pressure side 313 and the suction side 314 of the inner surfaces of the turbine vane airfoil 310 have a rectangle shape, and insert supports 334" formed at the border between the pressure side 313 and the rib 330 or the border between the suction side 314 and the rib 330 has a triangle shape. The rectangular insert supports 334' formed on the pressure side 313 and the suction side 314 are in contact with the insert 400 over a large area so as to secure a sufficient supporting force, and the triangular insert support 334" formed at the border between the pressure side 313/the suction side 314 and the rib 330 serves to provide an inclined contact surface to accommodate variations of the contact surface attributable to the tolerances. Particularly, the reason why the insert support 334" provided at the border between the pressure side 313 and the rib 330 or the border between the suction side 314 and the rib 330 is that it is advantageous in terms of demolding.

The structure for supporting the insert 400 will be described with reference to FIGS. 2 and 5. A three-point support structure is configured such that two insert supports 334 are respectively provided on the pressure side 313 and the suction side 314 of the inner surface of the turbine vane airfoil 310, and one insert support 334 is provided at the border between the pressure side 313 and the rib 330 or the border between the suction side 314 and the rib 330. The two rectangular insert supports 334' are provided respectively on the pressure side 313 and the suction side 314 to secure a sufficient supporting force.

A four-point support structure is configured such that two insert supports 334 are provided respectively on the pressure surface 313 and the suction surface 314 in the turbine vane airfoil 310 and two insert supports 334 are provided respectively on the border between the pressure surface 313 and the rib 330 and the border between the suction surface 314 and the rib 330. This four-point support structure secures a sufficient supporting force by arranging the two rectangular insert supports 334' respectively on the pressure surface 313 and the suction surface 314 and facilitates positioning of the insert 400 by using the two triangular insert supports 334".

On the other hand, in one embodiment of the present disclosure, some of the multiple insert supports 334 are relatively high and the others are relatively low, and the relatively high insert supports and the relatively low insert supports are alternately arranged in the circumferential direction of the cavity 332 and in the radial direction. In other words, the insert supports 334 are arranged such that the heights thereof are alternate in the radial direction (however, two insert supports have the same height in a three-point support structure). In addition, the heights of the insert supports 334 arranged in the rows are also alternate in the radial direction. This design is made to avoid a difficulty in inserting the insert 400 into the turbine vane airfoil, which is likely to be caused due to the tolerance on the height of the insert support 334. This design prevents a state in which all of the insert supports 334 arranged in rows in the radial direction 400 come into contact with the insert 400. That is, it may be possible to prevent an event in which the insert 400 is blocked by any one line of the insert supports and cannot be inserted any further when the insert 400 is inserted into the cavity of the turbine vane airfoil. It is also possible to form the insert supports 334 whose projection heights are nearly zero.

This alternating structure also reduces the insertion resistance attributable to friction between the insert and the insert supports 334, thereby facilitating the insertion of the insert 400. In the structure in which the heights of the insert supports 334 are alternate, so-called dummy insert supports that do not come into contact with the insert 400 exist. However, since the insert supports 334 supporting the insert 400 are regularly arranged, the insert 400 can be stably supported.

In this embodiment, when two insert supports 334 are disposed on the pressure surface 313 and the suction surface 314, respectively, of the inner surface of the turbine vane airfoil 310, and one insert support 334 is disposed either at the border between the pressure surface 313 and the rib 330 or at the border between the suction surface 314 and the rib 330, the insert 400 is supported by a three-point support structure in which the three points are arranged in two consecutive rows of the insert supports arranged on a cross section that transverses the radial direction of the insert 400.

When a four-point support structure is configured such that two insert supports 334 are provided respectively on the pressure side 313 and the suction side 314 of the inner surface of the turbine vane airfoil 310 and two insert supports 334 are provided respectively on the border between the pressure side 313 and the rib 330 and the border between the suction side 314 and the rib 330, four supporting points are provided in two consecutive rows on the cross section that transverses the radial direction.

According to another embodiment of the present disclosure, the plurality of insert supports 334 is arranged such that the heights of the insert supports 334 form a linear slope in the radial direction in which the rows of the insert supports 334 are arranged. That is, the heights of the insert supports 334 are in ascending order or descending order in the radial direction in which the rows of the insert supports 334 are arranged. This configuration can be confirmed from FIGS. 3 and 6.

When there is a linear change in the heights of the insert supports 334 positioned in the insert support rows arranged in the radial direction, there results in a change in the width of an annular space formed between the inner surface of the turbine vane airfoil 310 and the cavity 332 along the radial direction. The width of the annular space (e.g., the volume of the annular space) affects the intensity of the impingement cooling and the amount of compressed air discharged. Thus, the present disclosure is capable of locally varying the impingement cooling performance radially across the turbine vane 300 by appropriately designing the height variation of the insert supports 334 in the rows of the insert supports arranged in the radial direction.

In this case, the multiple insert supports 334 can be designed such that the height gradually increases starting from the insert inlet 350 through which the insert 400 is inserted into the turbine vane airfoil. This is because the insert 400 can be easily inserted into the cavity of the turbine vane airfoil without a significant resistance when the insert support 334 is closer to the insert inlet 350.

The bottom surface 352 of the insert is provided with a bent face 354 with a gap thereunder into which the insert 400 is inserted. The bent face 354 protruding from the bottom surface strongly supports the inner circumferential surface of the end of the insert 400 to strengthen the fixation of the insert 400 and to verify that the insert 400 is fully inserted. The bent face 354 prevents the cross-sectional shape of the insert 400 from being deformed. The bottom surface 352 of the insert is provided with an air passage inside the bent face 354.

It will be apparent to those skilled in the art that the present disclosure can be variously changed and altered through modifications, additions, and removals of some parts without departing from the spirit of the disclosure as defined in the appended claims.

What is claimed is:

1. A turbine vane comprising:
a turbine vane airfoil extending from a platform to an end wall and having an airfoil-shaped cross section having a leading edge, a trailing edge, and a pressure side and a suction side each of which extends from the leading edge to the trailing edge, wherein a plurality of cavities defined by a plurality of ribs extending from the pressure side to the suction side is formed in the turbine vane airfoil, at least one of the cavities is provided with a plurality of insert supports formed to protrude from an inner surface of the turbine vane airfoil, and the plurality of insert supports is arranged separately inside the cavity at intervals in a circumferential direction of the cavity and is arranged in a plurality of rows that is arranged at intervals in a radial direction,
wherein the plurality of insert supports in the rows arranged in the radial direction of the cavity is arranged such that heights of the plurality of insert supports show a linear change in the radial direction in which the rows of the insert supports are arranged.

2. The turbine vane according to claim 1, wherein a number of the insert supports arranged at intervals in the circumferential direction of the cavity is three or four.

3. The turbine vane according to claim 1, wherein the plurality of insert supports are disposed on the pressure side and the suction side of the inner surface of the turbine vane airfoil and at a border between the pressure side and a rib of the plurality of ribs or a border between the suction side and a rib of the plurality of ribs.

4. The turbine vane according to claim 3, wherein the plurality of insert supports formed on the pressure side and the suction side of the inner surface of the turbine vane airfoil have a rectangular-shaped cross section and the insert support of the plurality of insert supports formed at the border between the pressure side and the rib or the border between the suction side and the rib has a triangular-shaped cross section.

5. The turbine vane according to claim 3, wherein one insert support of the plurality of insert supports is disposed on each of the pressure side and the suction side of the inner surface of the turbine vane airfoil and one insert support of the plurality of insert supports is disposed at the border between the pressure side and the rib or the border between the suction side and the rib, so that a three-point structure is configured.

6. The turbine vane according to claim 3, wherein one insert support of the plurality of insert supports is disposed on each of the pressure side and the suction side of the inner surface of the turbine vane airfoil and one insert support of the plurality of insert supports is disposed at each of the border between the pressure side and the rib and the border between the suction side and the rib, so that a four-point structure is configured.

7. The turbine vane according to claim 1, wherein two insert supports of the plurality of insert supports are disposed respectively on the pressure side and the suction side of the inner surface of the turbine vane airfoil and one insert support of the plurality of insert supports is disposed at the border between the pressure side and the rib or the border between the suction side and the rib, so that a three-point structure in which three supporting points are disposed in two consecutive rows is formed.

8. The turbine vane according to claim 1, wherein two insert supports of the plurality of insert supports are disposed respectively on the pressure side and the suction side of the inner surface of the turbine vane airfoil and two insert supports of the plurality of insert supports are disposed at the border between the pressure side and the rib and the border between the suction side and the rib, so that a four-point structure in which four supporting points are disposed in two consecutive rows is formed.

9. A turbine vane assembly comprising:
a turbine vane having a turbine vane airfoil extending from a platform to an end wall and having an airfoil-shaped cross section having a leading edge, a trailing edge, and a pressure side and a suction side that extend from the leading edge to the trailing edge, wherein a plurality of cavities defined by a plurality of ribs extending from the pressure side to the suction side is formed in the turbine vane airfoil, at least one of the cavities is provided with a plurality of insert supports protruding inward from an inner surface of the turbine vane airfoil, the plurality of insert supports are arranged separately inside the cavity in a circumferential direction of the cavity and arranged in a plurality of rows arranged in a radial direction; and
a pipe-shape insert inserted in the cavity, supported by the plurality of insert supports, and provided with a plurality of through holes formed in a surface thereof,
wherein the plurality of insert supports in the rows arranged in the radial direction of the cavity is arranged such that heights of the plurality of insert supports show a linear change starting from an insert inlet through which the insert is inserted into the cavity of the turbine vane airfoil.

10. The turbine vane assembly according to claim 9, wherein the insert has a cross-sectional shape similar to a cross-sectional shape of the cavity, resulting in a structure in which an annular space formed between the inner surface of the turbine vane airfoil and the cavity has a uniform width.

11. The turbine vane assembly according to claim 9, wherein a number of the insert supports arranged at intervals in the circumferential direction of the cavity is three or four.

12. The turbine vane assembly according to claim 9, wherein the plurality of insert supports are disposed on the pressure side and the suction side of the inner surface of the turbine vane airfoil and at a border between the pressure side and a rib of the plurality of ribs or a border between the suction side and a rib of the plurality of ribs.

13. The turbine vane assembly according to claim 12, wherein the plurality of insert supports formed on the pressure side and the suction side of the inner surface of the turbine vane airfoil have a rectangular-shaped cross section and the insert support of the plurality of insert supports formed at the border between the pressure side and the rib or the border between the suction side and the rib has a triangular-shaped cross section.

14. The turbine vane assembly according to claim 12, wherein one insert support of the plurality of insert supports is disposed on each of the pressure side and the suction side of the inner surface of the turbine vane airfoil and one insert support of the plurality of insert supports is disposed at the border between the pressure side and the rib or the border between the suction side and the rib, so that a three-point structure is configured.

15. The turbine vane assembly according to claim 12, wherein one insert support of the plurality of insert supports is disposed on each of the pressure side and the suction side of the inner surface of the turbine vane airfoil and one insert support of the plurality of insert supports is disposed at each of the border between the pressure side and the rib and the border between the suction side and the rib, so that a four-point structure is configured.

16. The turbine vane assembly according to claim 9, wherein two insert supports of the plurality of insert supports are disposed respectively on the pressure side and the suction side of the inner surface of the turbine vane airfoil and one insert support of the plurality of insert supports is disposed at the border between the pressure side and the rib or the border between the suction side and the rib, so that a three-point structure is configured.

17. The turbine vane assembly according to claim 9, wherein two insert supports of the plurality of insert supports are disposed respectively on the pressure side and the suction side of the inner surface of the turbine vane airfoil and two insert supports of the plurality of insert supports are disposed at the border between the pressure side and the rib and the border between the suction side and the rib, so that a four-point structure in which four supporting points are positioned in two consecutive rows is configured.

* * * * *